United States Patent [19]
Spinella

[11] 3,888,116
[45] June 10, 1975

[54] DIGITAL TORQUEMETER AND THE LIKE

[75] Inventor: Rinaldo A. Spinella, Cambridge, Mass.

[73] Assignee: Massachusetts Institute of Technology, Cambridge, Mass.

[22] Filed: Oct. 11, 1973

[21] Appl. No.: 405,573

[52] U.S. Cl. .......................... 73/136 A; 235/151.3
[51] Int. Cl. .............................................. G01l 3/12
[58] Field of Search ..................... 73/136 A, 151.3

[56] References Cited
UNITED STATES PATENTS

| | | | |
|---|---|---|---|
| 3,158,854 | 11/1964 | Keen et al. | 235/92 MT |
| 3,640,131 | 2/1972 | Turk | 73/136 A |

OTHER PUBLICATIONS

Metron Instrument Company Bulletin No. 300, July 1, 1959.

Primary Examiner—Charles A. Ruehl
Attorney, Agent, or Firm—Arthur A. Smith, Jr.; Robert Shaw; Martin M. Santa

[57] ABSTRACT

A digital torquemeter wherein optical signals are converted to electric signals in the form of variable-width pulses, the pulse width being indicative or torque transmitted by a shaft. The electrical pulses are connected to digital means wherein the pulses are converted to binary or decimal numbers.

6 Claims, 6 Drawing Figures

DIGITAL TORQUEMETER AND THE LIKE

The present invention relates to a torquemeter adapted to provide torque values in the form of numbers.

In applications for Letters Patent Ser. No. 141,486 (now abandoned), filed May 10, 1971 (Pratt, Jr., et al), Ser. No. 264,120 (now abandoned), filed June 19, 1972 (Pratt, Jr., et al), Ser. No. 264,121 filed June 19, 1972 (Pratt, Jr., et al) and an application entitled "High-Accuracy Optical Torquemeter," (Ward, et al), Ser. No. 405,612, filed Oct. 11, 1973, there are described a number of embodiments of an optical torquemeter. It is an object of the present invention to provide apparatus adapted to convert optical signals or pulses of the type discussed in said applications to digital signals which represent torque being delivered by a rotating shaft.

Another object is to provide a digital torquemeter of more general scope.

Still another object is to provide apparatus of more general scope.

These and still further objects are brought out in the description that follows and are particularly pointed out in the appended claims.

By way of summary, the objects of the invention are attained by apparatus for measuring torque transmitted by a rotating shaft that comprises, in combination, means for producing a pulse-width-modulated signal as a train of pulses, digital means to receive the signal and to convert the pulse width to torque values, said digital means including a first counter, a second counter, each counter having appropriate means to establish one revolution (or a fraction or multiple thereof) of the shaft, a high frequency clock having very small (~0.005%) variance connected as one input to the gating logic of each counter, the signal being connected as a further input to the gating logic of the first counter, the means to establish one revolution (or a fraction or multiple thereof) having an electrical output that is connected as a further input to the gating logic of each counter, calculator means connected to receive as input the output of both the first counter and the second counter and adapted to provide as output a number representing torque, and controller means to coordinate the functioning of the first counter, the second counter, the means to establish one revolution (or fraction or multiple thereof) and the calculation process for the numerical torque value.

The invention is hereinafter described with reference to the accompanying drawing in which.

Figure 1:
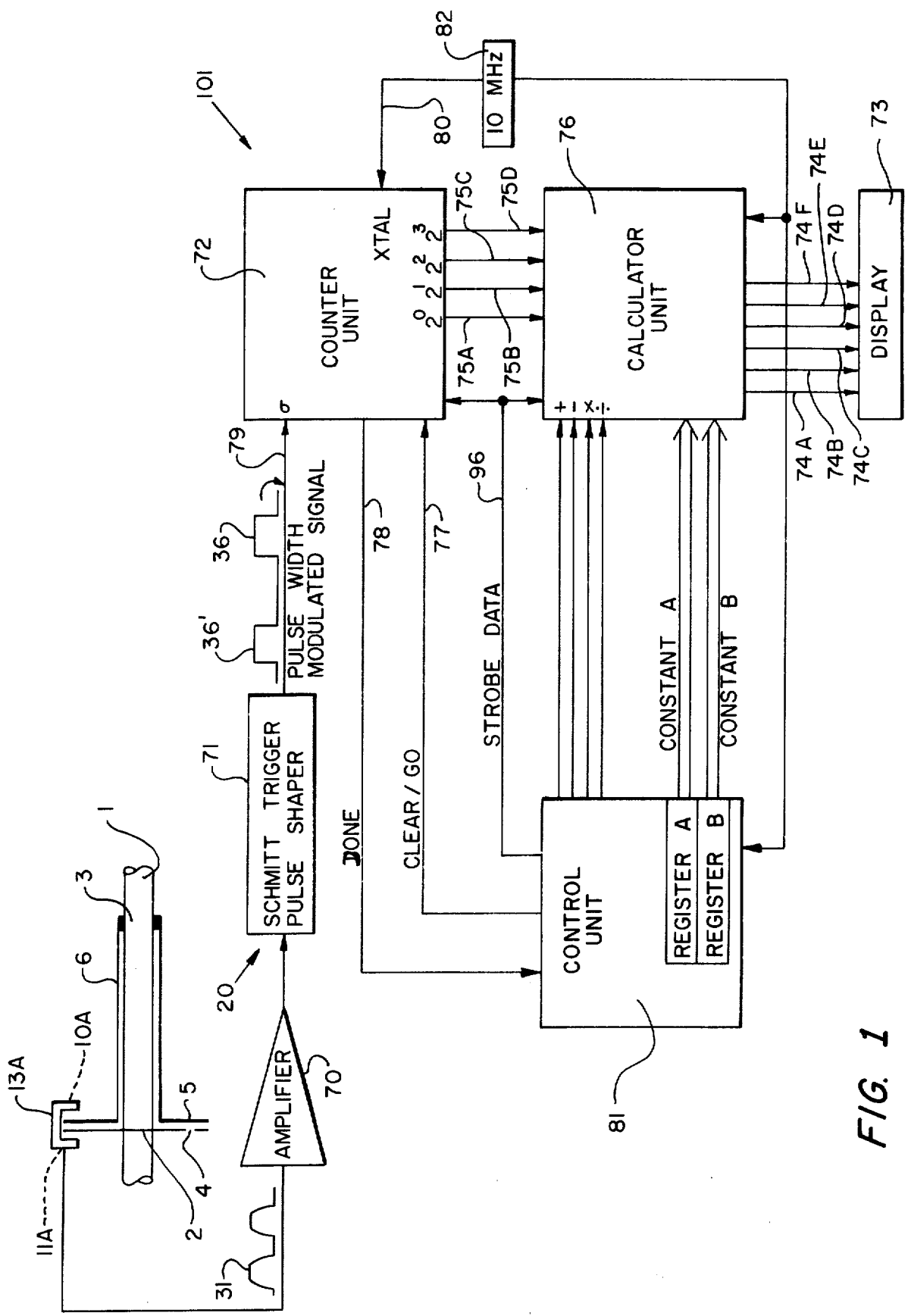
FIG. 1 is a schematic circuit diagram, partially block diagram in form, of a torquemeter embodying the present inventive concepts.

Referring now to FIG. 1, there is shown at 101 a torquemeter for measuring torque transmitted by a shaft 1 as the shaft rotates. As is explained in great detail in said applications and hereafter in lesser detail, the torque transmitted by the shaft 1 is converted to variable-width electric pulses such as, for example, the rectangular-wave pulses 36' in the pulse train labeled 36. The pulses 36' are of variable time duration, the time duration or width of each pulse 36' being related to the torque transmitted by the shaft (as well as the shaft rpm). The pulses 36' are derived from optical signals or pulses as now explained; it should be noted in this connection that FIGS. 3, 4, 5 and 6 are substantially identical to figures in the Ward et al application. It should also be noted that the pulse train 36 can be taken from a system involving one radiation source and one detector, or it can come from a system having the three sources shown at 10A, 10B and 10C in FIG. 3 and three respective detectors 11A, 11B, etc. held in rigid mechanical disposition by unitary mechanical elements such as the element 13A which houses the source 10A and the pickup 11A. In the following explanation one source and one pickup or detector are discussed.

Figure 3:
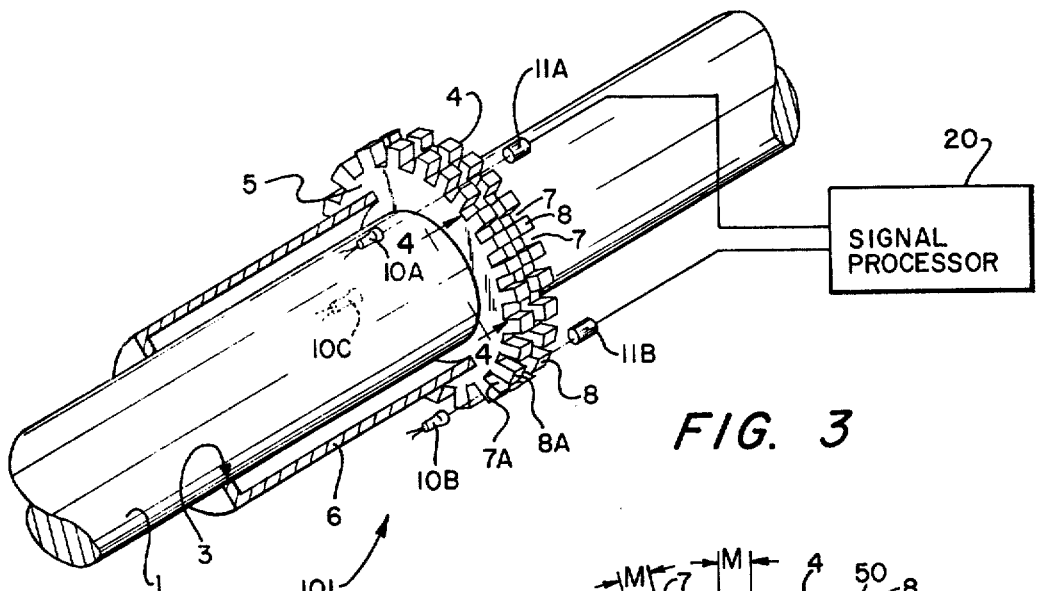
FIG. 3 is a diagrammatic isometric view of the mechanical features of the torquemeter, the signal processing portions thereof being shown in block diagram form.
Figure 4:
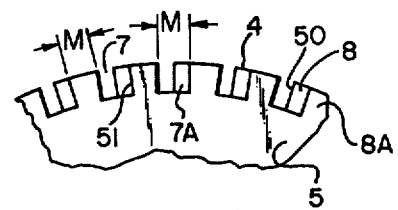
FIG. 4 is an enlarged partial view taken upon the line 4—4 in FIG. 3 looking in the direction of the arrows.

The torquemeter 101 is adapted to measure torque transmitted by the shaft labeled 1 as the shaft rotates and this is done by measuring the twist upon the shaft 1 (in either direction of twist) due to torque between a first axial region 2 of the shaft and a second region 3 axially spaced along the shaft from the first region. The apparatus 101 comprises closely, axially-spaced, coaxial discs 4 and 5 secured to the shaft to rotate therewith. The disc 4 is secured to the shaft at the first region 2 and the disc 5, as shown, is mounted on a sleeve 6 which is secured to the shaft 1 at the second region 3; the sleeve 6 extends axially toward the first region to place the discs in very close axial proximity to one another. Each of the discs 4 and 5 has successive contiguous areas 7, 8 and 7A, 8A, respectively, of different optical characteristics extending circumferentially around the disc. In the embodiment herein disclosed, as best shown in FIGS. 3 and 4, the areas 7 and 7A are slots and the areas 8 and 8A are teeth so that the adjacent areas are alternately radiation transmitting and radiation opaque. The areas 7, etc. extend circumferentially to form an annular pattern on each disc, the major radii of the annuluses being substantially equal so that radiation from the radiation source 10A can pass through the slots 7 and 7A, to the radiation detectors 11A positioned to receive the radiation from the source 10A after it has passed through the slots of both discs. The radiation detector 10A is operable to provide a series of electric pulses, like the pulses shown at 31 in FIG. 1, as a pulse train.

The pulses 31 form a pulse train of electric pulses that are pulse-width modulated as a function of the torque (clockwise or counterclockwise) transmitted by the shaft 1; the series of pulses 31 is connected to a digital signal processor 20, as now explained.

The pulses 31 are connected as input to an amplifier 70 and thence to a Schmitt trigger 71, the output of the Schmitt trigger being the rectangular-wave pulses 36' whose widths are functions of torque. The pulses 36' are connected as one input to a counter 72, then to other digital components for processing to provide on a display unit 73 a number which can be binary or decimal and which indicates the transmitted torque value. The inputs 74A, 74B ... to the display, of course, can be connected as input to other circuit elements as more particularly described in the Pratt et al application. At any rate, as now discussed, the counter unit 72, etc. processes the pulses train 36 to provide, among other things, its duty cycle, where the $$\text{duty cycle} = \frac{\text{pulse width} \quad (\text{i.e., } t_2-t_1 \text{ in FIG. 6})}{\text{pulse period} \quad (\text{i.e., } t_3-t_1 \text{ in FIG. 6})}$$

In the explanation the actual arithmetic operations are performed by a calculator unit 76 and are in the form $$B\left(\frac{X}{Y} - A\right),$$

where X represents the summation of counts as later discussed, between $t_1$ and $t_2$ (i.e., pulse width) for some cycle or period T (i.e., for some angular displacement such as one revolution), Y represents the summation of counts between $t_1$ and $t_3$ for the cycle T, A is a constant representing $X/Y$ where no torque is present on the shaft 1, and B is a constant representing twist of the shaft as a function of transmitted torque. The constants A and B are derived from register A and register B, respectively, within a control unit 81.

In operation the rectangular-wave pulses 36' are processed in this way. It is assumed that the cycle T for counting is one revolution. Over the one revolution the counter unit 72 counts the total number of clock pulses from a 10 MHz clock 82 during the time that pulses 36' are present and the counter unit 72 also counts the total number of clock pulses that occur during the one revolution. The first-named count is then divided by the second-named count; the quotient is subtracted from the quotient that obtains at zero torques and the difference, thereby calculated, is a number that is directly proportional to the torque transmitted by the shaft. The mathematical process, as above mentioned, is done by the calculator 76, under the direction of the controller 81. While the mathematical procedure is occurring, the counter does not receive pulses 36'. Following calculation, an output number passes to the display 73 and at the same time the counter unit is given a clear/go signal to start another counting cycle. The display 73, of course, contains appropriate registers to permit the display of torque— as well as power, rpm, etc., as later mentioned.

The period T can represent a full revolution of the shaft 1, more than one revolution, or less than one revolution, as use requirements permit and/or require. The message delivered to the display 73 is a measure of the torque delivered by the shaft, whether the consequent twist of the shaft is clockwise or counterclockwise. Also, the pulses 36' are interpretable by the counter to give the rpm of the shaft and changes in the rpm (i.e., acceleration and deceleration) as well as changes in torque. A multiplication step can be done by the calculator, therefore, to give such values as torque and changes on torque, rpm and changes in rpm, and power being delivered by the shaft and changes in power, as outputs from the calculator unit 76.

Figure 2:
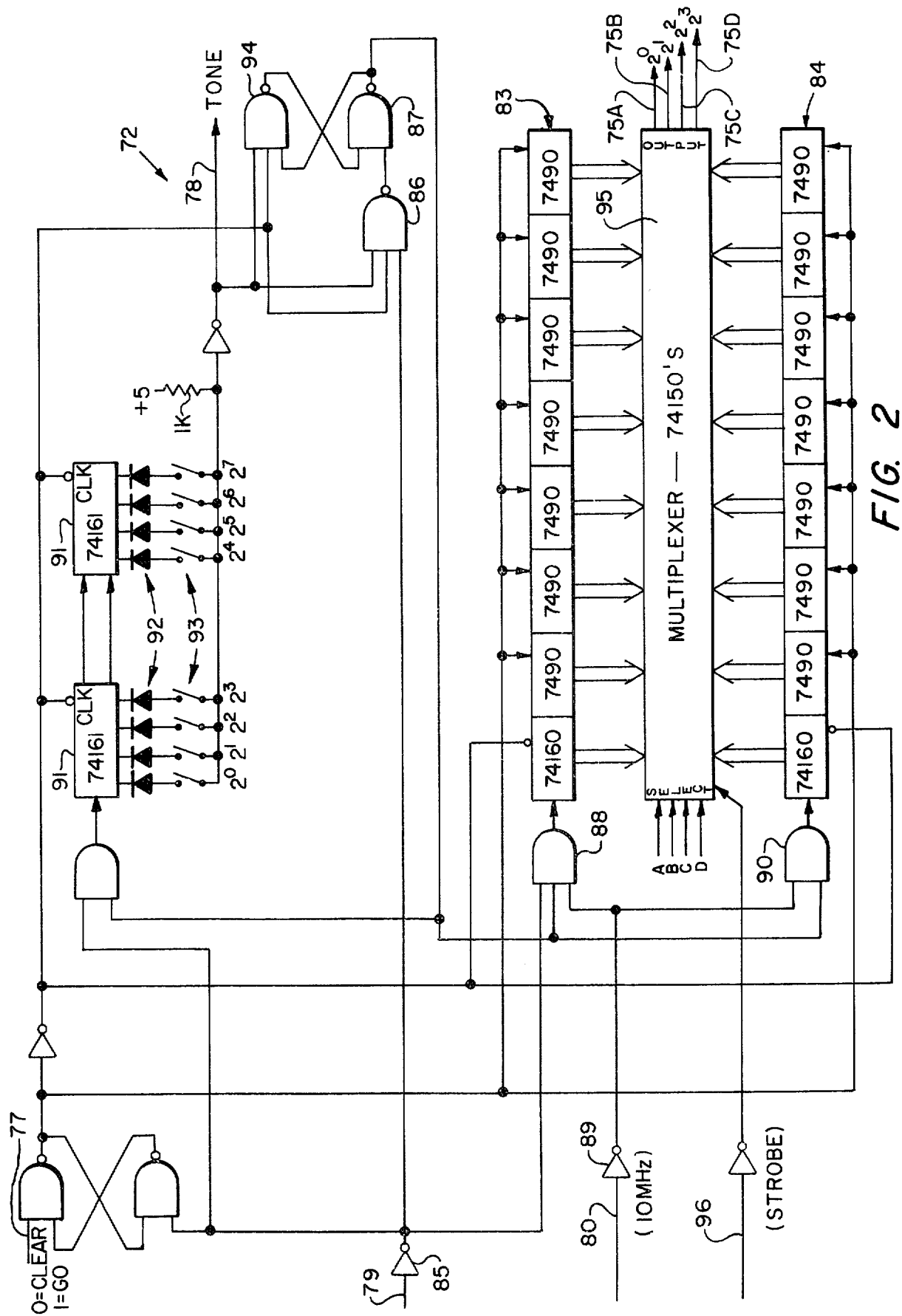
FIG. 2 shows in some detail the counter unit shown in block diagram form in FIG. 1.

The explanation in this paragraph and the next few paragraphs is of the counter unit 72 that is shown in detail in FIG. 2. Perhaps the best way to approach this explanation is to note first the various inputs to and outputs from the counter unit, further matters being taken up in the next few paragraphs. The pulse train 36 is connected at the input labeled 79. Initiation and termination of counting are determined by an input at 77 from the control unit 81; in the arrangement shown a 0 = clear and a 1 = go. The values X and Y are measured in terms of a 10 MHz signal from the clock 82 connected at 80 to the counter unit. A reset or time signal, connected to the controller 81 by a conductor 78, causes the controller to begin a new cycle once the various counts and calculations have been completed; more will be said about this later.

The number representing torque is a binary coded decimal in the form $2^0$, $2^1$ ... carried by conductors 75A, 75B ..., respectively. In the explanation in the next paragraph the X and Y counts are made for one revolution and the discs 4 and 5 each are deemed to have ninety teeth and slots.

The high-frequency clock 82 (which must have very small variance, e.g., ~ 0.005%) is connected through a buffer 89 as one input to gating logic, comprising AND gates 88 and 90, to a first counter 83 and a second counter 84, respectively. The pulse-width modulated signal 36 is connected through a buffer 85 and the gate 88 as a further input to the first counter 83. Another input to each counter is received from a combination of NAND gates 86, 87, and 94 that establishes the occurrence of one revolution of the shaft. The means to establish one revolution to the shaft includes: a third counter 91 (comprising two 25 MHz counters); a plurality of diodes 92, which provides an equals comparator function;, and a plurality of series switches, which acts as a register 93 against which the count in the counter 91 is compared, that is, the combination of the diodes 92 and the series switches forms a register-comparator. In the torquemeter the switches are closed in a pattern which gives a binary count (i.e., in FIG. 2 the $2^0$, $2^1$, $2^3$, $2^4$ and $2^6$ switches of the register 93 are closed), representing a predetermined count which represents one revolution (or other cycle T) of the shaft, said predetermined count being the number of slots and teeth (here ninety) plus one. At the end of a revolution as thus determined, a message is sent along the line 78 to the controller unit 81 instructing the controller unit to reset the third counter 91 by a clear/go message on the line 77. It should be noted at this juncture that the third counter 91, etc. can be made to establish a part of a revolution of the shaft, said part being more than, less than, or equal to one revolution, depending upon the circumstances in which the torquemeter is used.

The counters 83 and 84 are decimal counters, but can be binary. The counter 83, as noted, is clocked by the AND gate 88, and the counter 84 is clocked by the AND gate 90. The counters 83 and 84 are each made up of eight sub-counters, as shown, and each sub-counter has a four-wire output connected to a multiplexer 95. The multiplexer provides an output on the four wires 75A, 75B, 75C and 75D which corresponds to the output of one of the sub-counters at a time; the particular counter selected to provide an output from the multiplexer at any one time is determined by a binary code designated A, B, C, D connected to the "select" end of the multiplexer. The particular code message comes from the control unit 81. The line labeled 96 carries a strobe data message from the control unit to the counter 72 and to the calculator unit 76. The strobe data signal acts to trigger transfer of data from any sub-counter to the multiplexer 95 and at the same time make the calculator unit aware of the transfer.

In FIG. 1 the control unit 81 and the calculator unit 76 are shown as separate units in the digital signal processor 20. In fact, the functions of both units can be performed by commercially available chips properly programmed. One such system of chips is the PPS-25 manufactured by Fairchild Semiconductor. The PPS-25 system is a complete processing unit which has the characteristics of a mini-computer. The instruction sequence for the processor is coded in a non-volatile read-only memory. In the context of the present explanation the chip output can be any one or all of the torque transmitted by the shaft, changes in torque, power, changes in power, rpm, and changes in rpm. The output of the chip is in the form of a binary number or a multiple output.

Figure 5:
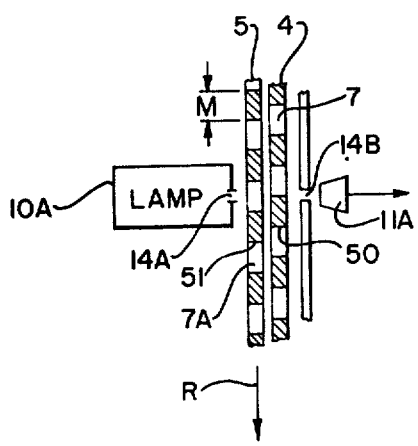
FIG. 5 is an enlarged schematic representation of a part of the mechanical elements in FIG. 3.
Figure 6:
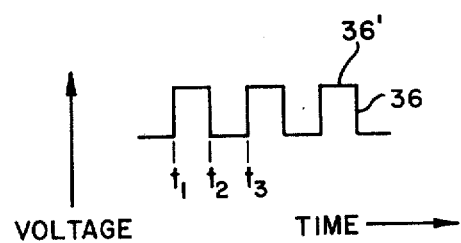
FIG. 6 shows a rectangular-wave electric signal in the form of a series of voltage pulses whose width varies as a function of the torque measured by the torquemeter in FIG. 1, the pulse width being an indication of said torque in either direction, clockwise, or counter clockwise.

A few other matters are taken up in this paragraph, mostly with reference to FIG. 5. The element marked 13A in FIG. 1, that houses the source 10A and detector 11A rigidly, has slits 14A and 14B. Radiation from the source 10A passes through the slit 14A to narrow the beam, through the slots 7 and 7A and through the slit 14B to strike the detector 11A. The slits 14A and 14B must be narrow compared to the circumferential length labeled M of the slots 7-7A and teeth 8-8A so that the effective portion of the detector 11A, that receives radiation, is small in cross dimension. Said another way, in order to have the necessary fast rise and fall times of pulse from the detector 11A it is necessary, among other things, that the dimension of the effective portion of the detector in the direction of travel (the direction indicated by the arrow shown at R) of the successive contiguous areas 7-8 and 7A-8A therepast be small compared to the length M of the areas 7, etc. in such direction and that the detector light-to-electrical-energy time response constant be fast compared to the time of passage of the areas past the detector. In the particular apparatus discussed in the Ward et al application the slits 14A etc. and 14B etc. are the order of 5-6 mils across and the slots 7, 7A and teeth 8, 8A the order of 0.062 inches in circumferential length M. The width of any of the optical pulses and resulting electrical pulses 31 is a function of tooth overlap and the variable of interest is the ratio of such overlap to slot-to-slot transit time as above noted. This makes the necessary measurements basically independent of angular speed of the shaft. In FIGS. 4 and 5 the edges or boundaries between the slots and teeth of the disc 4 are labeled 50 and those of the discs are labeled 51.

It should be apparent on the basis of the foregoing explanation that the present invention is directed primarily to a mechanism for providing torque and related outputs which are derived from optical pulses generated in a system of the type described in the Pratt et al and Ward et al applications. As is explained in some detail in the applications, in order for any readings to be meaningful the apparatus must be capable of sensing differences in shaft twist of the order of micro-radians, that is, differences in the positions of the edges 50 and 51 of the order of micro-inches. Among other things, to provide the sensitivity necessary the point of triggering to provide the necessary accuracy of pulse width of the pulses 36' must be given careful consideration and this is done in the apparatus of the applications mentioned. It should also be apparent from this explanation and the others that the required accuracy at least for the purposes mentioned in said applications limits the torquemeter apparatus to one employing optical signals. The slots and teeth of the discs 4 and 5 can, of course, be replaced by adjacent successive areas having different optical characteristics which may be made by example by various etching processes or lithographic processes and the discs in this instance can be transparent or translucent plastic, properly treated. In any event, it is quite difficult to obtain absolute accuracy of width of the areas 7, etc. Thus, in the present explanation and in the explanations in the other applications, time averaging is employed. In this specification the time averaging is done digitally, as before explained.

Further modifications of the invention herein described will occur to persons skilled in the art and all such modifications are deemed to be within the spirit and scope of the invention as defined by the appended claims.

What is claimed is:

1. Apparatus for measuring torque transmitted by a rotating shaft that comprises, in combination, means for producing a pulse width modulated signal as a train of electric pulses, digital processing means to receive the signal and to relate the pulse width to the transmitted torque, said digital processing means including a first counter, a second counter, means to establish a given period of shaft rotation, a high frequency clock having very small variance connected as one input to the gating logic of each counter, the signal being connected as a further input to the gating logic of the first counter, the means to establish said given period having an electric output that is connected as a further input to the gating logic of each counter, calculator means connected to receive as input the outputs of both the first counter and the second counter and adapted to provide as output a number representing torque, and controller means to coordinate the functioning of the second counter, the means to establish said given period, and the calculation process for the numerical value of transmitted torque.

2. Apparatus as claimed in claim 1 in which the means to establish a given period comprises a third counter connected to receive as input the pulse width modulated signal and adapted to count the pulses, a register-comparator comprising a plurality of diodes and series switches representing a predetermined count which represents said given period of shaft rotation, said controller being connected to the third counter to receive an indication when the predetermined count has been received by the third counter and then to instruct the calculator means to perform the arithmetic determination of torque, to issue a command to clear the first counter, the second counter, and the third counter, to issue a command to the register-comparator to determine another period.

3. Apparatus as claimed in claim 2 which further includes a first register and a second register connected to the calculator means to provide the necessary constants to allow the calculator means to perform the arithmetic determination of torque, said determination being in the form $B([Y/Y] - A)$, where $X$ represents the count in the first counter, $Y$ represents the count in the second counter, $A$ is a constant representing $X/Y$ when no torque is present on the shaft and is provided by the first register, and $B$ is a constant representing twist of the shaft as a function of transmitted torque and is provided by the second register.

4. Apparatus for measuring torque transmitted by a rotating shaft that includes, in combination: a source of radiation, a first element disposed around and secured to the shaft at a first region of the shaft, a second element disposed around the shaft and secured to the shaft at a second region axially displaced along the shaft from the first region, each element being composed of successive contiguous areas of different optical characteristics having a boundary between adjacent areas, radiation from the source of radiation being chopped by the first element and the second element to provide an optical signal, pickup means positioned to receive the optical signal and thereby sense the passage of a boundary on the first element and the passage of a boundary on the second element past the pickup means as the shaft rotates and to develop a pulse width modulated electric signal as a train of pulses, digital processing means connected to receive the signal and adapted to convert pulse width to transmitted torque values, said digital processing means including a first counter having gating logic at its input, a second counter having gating logic at its input, each counter having appropriate means to establish a period T, a high frequency clock having very small variance connected as one input to the gating logic of each counter, the pulse width modulated electric signal being connected as a further input to the gating logic of the first counter, the means to establish the period T having an electrical output that is connected as a further input to the gating logic of each counter, calculator means connected to receive as input the output of both the first counter and the second counter and adapted to provide as output a number representing transmitted torque, and controller means to coordinate the functioning of the first counter, the second counter, the means to establish the period T and the calculation process to arrive at said number.

5. Apparatus as claimed in claim 4 in which said elements are discs slotted at or near the periphery to provide said areas in the form of slots and teeth of the thusly slotted disc, the radiation as it passes through the discs being chopped to form optical pulses whose duty cycle is a function of the torque transmitted by the shaft.

6. Apparatus as claimed in claim 5 in which one of said discs is secured coaxially to the shaft at the first region and the second of said discs is mounted on a sleeve which is secured to the shaft at the second region, the sleeve extending axially toward the first region to bring the discs within close proximity of one another.

* * * * *